United States Patent
Lim (10) Patent No.: US 10,173,716 B2
(45) Date of Patent: Jan. 8, 2019

(54) STEERING RETURN CONTROL APPARATUS AND METHOD OF MOTOR DRIVEN POWER STEERING

(71) Applicant: HYUNDAI MOBIS CO., LTD., Seoul (KR)

(72) Inventor: Kyoung Soo Lim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/646,480

(22) Filed: Jul. 11, 2017

(65) Prior Publication Data

US 2018/0009467 A1   Jan. 11, 2018

(30) Foreign Application Priority Data

Jul. 11, 2016   (KR) .................. 10-2016-0087742

(51) Int. Cl.
  *B62D 5/04*   (2006.01)
  *B62D 6/02*   (2006.01)
  *B62D 6/08*   (2006.01)

(52) U.S. Cl.
  CPC ............ *B62D 5/0466* (2013.01); *B62D 6/02* (2013.01); *B62D 6/08* (2013.01)

(58) Field of Classification Search
  USPC ........................................... 701/41
  See application file for complete search history.

(56) References Cited

U.S. PATENT DOCUMENTS

| | | | | |
|---|---|---|---|---|
| 5,919,241 A * | 7/1999 | Bolourchi | ............ | B62D 5/0472 180/443 |
| 2008/0140285 A1* | 6/2008 | Sekiya | ................. | B60G 17/018 701/38 |
| 2009/0024278 A1* | 1/2009 | Kondo | ..................... | B62D 1/28 701/41 |
| 2009/0024281 A1* | 1/2009 | Hwang | ................. | B62D 5/006 701/42 |
| 2009/0043452 A1* | 2/2009 | Sekiya | ............... | B60G 17/0165 701/40 |

(Continued)

FOREIGN PATENT DOCUMENTS

KR   10-2010-0114995 A   10/2010

*Primary Examiner* — Tyler D Paige
(74) *Attorney, Agent, or Firm* — Knobbe Martens Olson & Bear LLP (57) ABSTRACT

A steering return control apparatus of MDPS may include: a column torque sensor configured to sense a column torque of a steering wheel; a steering angle sensor configured to measure a steering angle of the steering wheel; a column velocity calculator configured to calculate a column velocity at which a steering column is rotated; a vehicle velocity sensor configured to sense a vehicle velocity; a lateral acceleration sensor configured to sense a lateral acceleration of the vehicle; and a damping controller configured to detect a damping compensation gain in an on-center region according to at least one of the column torque, the column velocity and the lateral acceleration, and applies the damping compensation gain to a default damping amount, when the steering angle falls within the on-center region while at least one of the column torque, the column velocity and the vehicle velocity satisfies a preset damping compensation condition.

7 Claims, 7 Drawing Sheets

(56) References Cited

U.S. PATENT DOCUMENTS

| | | | |
|---|---|---|---|
| 2010/0125390 A1* | 5/2010 | Fernandez | B62D 5/0466 701/41 |
| 2011/0132324 A1* | 6/2011 | Kociba | F02D 41/0002 123/406.23 |
| 2014/0088835 A1* | 3/2014 | Sworn | B62D 5/0463 701/42 |
| 2015/0266504 A1* | 9/2015 | Kunihiro | B62D 5/0463 701/41 |
| 2016/0318546 A1* | 11/2016 | Lee | B62D 5/0466 |
| 2017/0015351 A1* | 1/2017 | Endo | B62D 6/00 |
| 2017/0144697 A1* | 5/2017 | Lim | B62D 5/0466 |

* cited by examiner

STEERING RETURN CONTROL APPARATUS AND METHOD OF MOTOR DRIVEN POWER STEERING

CROSS-REFERENCES TO RELATED APPLICATIONS

The present application claims priority to Korean application number 10-2016-0087742, filed on Jul. 11, 2016, which is incorporated by reference in its entirety.

BACKGROUND OF THE INVENTION

The present invention relates to a steering return control apparatus and method of MDPS (Motor Driven Power Steering), and more particular, to a steering return control apparatus and method of MDPS, which is capable of minimizing a slight sense of difference in an on-center region when a steering wheel is returned after a vehicle was steered at a large steering angle during driving.

In general, MDPS represents a system that assists handling by providing an assist torque in a steering direction of a driver, using an electric motor. The MDPS can autonomously control the operation of the electrical motor, depending on a traveling condition of a vehicle, thereby improving the steering performance and steering feel.

When determining that the vehicle was turned to a desired extent after a steering input was applied to turn the vehicle, the driver may release the steering wheel. In this case, the steering wheel is returned to the center by its return operation. The return operation of the steering wheel is performed by self alignment torque of a tire. Typically, when the vehicle is turned at a velocity of 5 km/h to 30 km/h, the return operation can be usefully applied. However, the self alignment torque applied to the steering wheel is not enough to return the steering wheel to the center because the frictional behavior of the steering system causes a remaining steering angle.

Thus, a separate function of assisting the return operation is inevitably provided to completely return the steering wheel to the center. Therefore, the MDPS applies a return torque which is calculated based on a steering angle, and assists the return operation of the steering wheel, thereby improving the return performance.

The related art is disclosed in Korean Patent Publication No. 2010-0114995 published on Oct. 27, 2010 and entitled "Steering return control method of MDPS".

In the damping logic of the conventional MDPS, however, when a damping amount is adjusted for a fast return performance of the steering wheel, an overshoot may occur in an on-center region. When the damping amount is adjusted to reduce an occurrence of overshoot, the return velocity of the steering wheel may be lowered. Therefore, the damping amount in the on-center region is properly adjusted. However, when a driver turns the steering wheel at a similar velocity to the return velocity of the steering wheel, a slight sense of difference may occur in the on-center region.

SUMMARY OF THE INVENTION

Embodiments of the present invention are directed to a steering return control apparatus and method of MDPS, which is capable of minimizing a slight sense of difference in an on-center region when a steering wheel is returned after a vehicle was steered at a large steering angle during driving.

In one embodiment, a steering return control apparatus of MDPS may include: a column torque sensor configured to sense a column torque of a steering wheel; a steering angle sensor configured to measure a steering angle of the steering wheel; a column velocity calculator configured to calculate a column velocity at which a steering column is rotated, based on the steering angle sensed by the steering angle sensor; a vehicle velocity sensor configured to sense a vehicle velocity; a lateral acceleration sensor configured to sense a lateral acceleration of the vehicle; and a damping controller configured to detect a damping compensation gain in a preset on-center region according to at least one of the column torque, the column velocity and the lateral acceleration, and applies the detected damping compensation gain to a default damping amount, when the steering angle falls within the on-center region while at least one of the column torque, the column velocity and the vehicle velocity satisfies a preset damping compensation condition.

When at least one of the column torque, the column velocity and the vehicle velocity satisfies the damping compensation condition, the damping controller may detect a damping compensation gain according to at least one of the column torque and the column velocity, and apply the detected damping compensation gain to the default damping amount.

The damping controller may increase the return velocity of the steering wheel by decreasing a damping slope according to the column velocity.

The on-center region may have a range that is variably set depending on the vehicle velocity.

The damping controller may linearly control one or more of a column torque gain for the column torque, a column velocity gain for the column velocity, and a lateral acceleration gain for the lateral acceleration in the on-center region.

The damping controller may adjust the lateral acceleration gain to be proportional to the lateral acceleration.

When the lateral acceleration is equal to or less than a preset lateral acceleration reference value, the damping controller may set the lateral acceleration gain to a preset lateral acceleration gain value or less, and adjust the damping compensation gain to a preset damping compensation gain value or less.

The damping controller may adjust the column velocity gain to be proportional to the column velocity.

The damping controller may adjust the column torque gain to be inversely proportional to the column torque.

In another embodiment, a steering return control method of MDPS may include: calculating, by a damping controller, a default damping amount based on at least one of a column torque and column velocity depending on a vehicle velocity; determining, by the damping controller, whether at least one of the column torque, the column velocity and a vehicle velocity satisfies a preset damping compensation condition, detecting a damping compensation gain according to at least one of the column torque and the column velocity when the determination result indicates that the damping compensation condition is satisfied, and applying the detected damping compensation gain to the default damping amount; and determining, by the damping controller, whether the steering angle falls within a preset on-center region while the damping compensation condition is satisfied, detecting a damping compensation gain in the on-center region according to at least one of the column torque, the column velocity and a lateral acceleration when the determination result indicates that the steering angle falls within the on-center region, and applying the detected damping compensation gain to the default damping amount.

The damping controller may increase the return velocity of the steering wheel by decreasing a damping slope according to the column velocity.

The damping controller may linearly control one or more of a column torque gain for the column torque, a column velocity gain for the column velocity, and a lateral acceleration gain for the lateral acceleration in the on-center region.

The damping controller may adjust the lateral acceleration gain to be proportional to the lateral acceleration.

When the lateral acceleration is equal to or less than a preset lateral acceleration reference value, the damping controller may set the lateral acceleration gain to a preset lateral acceleration gain value or less, and adjust the damping compensation gain to a preset damping compensation gain value or less.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
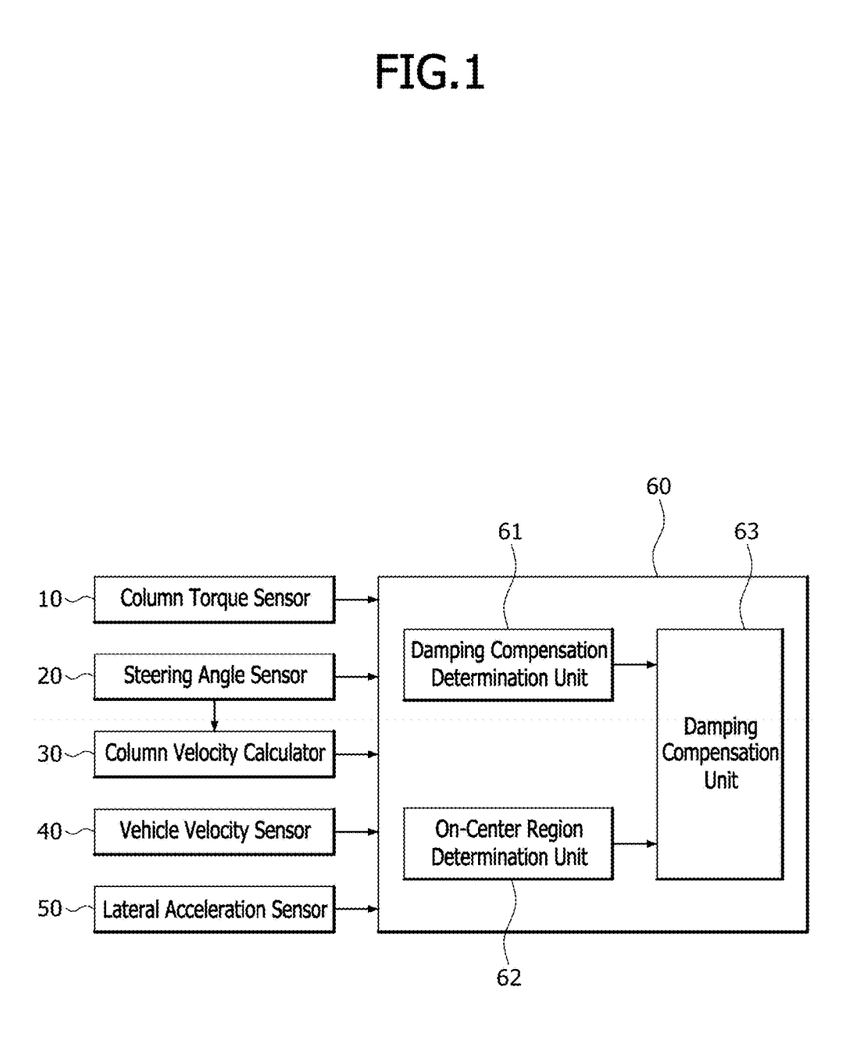
FIG. 1 is a block diagram illustrating a steering return control apparatus of MDPS in accordance with an embodiment of the present invention.
Figure 2:
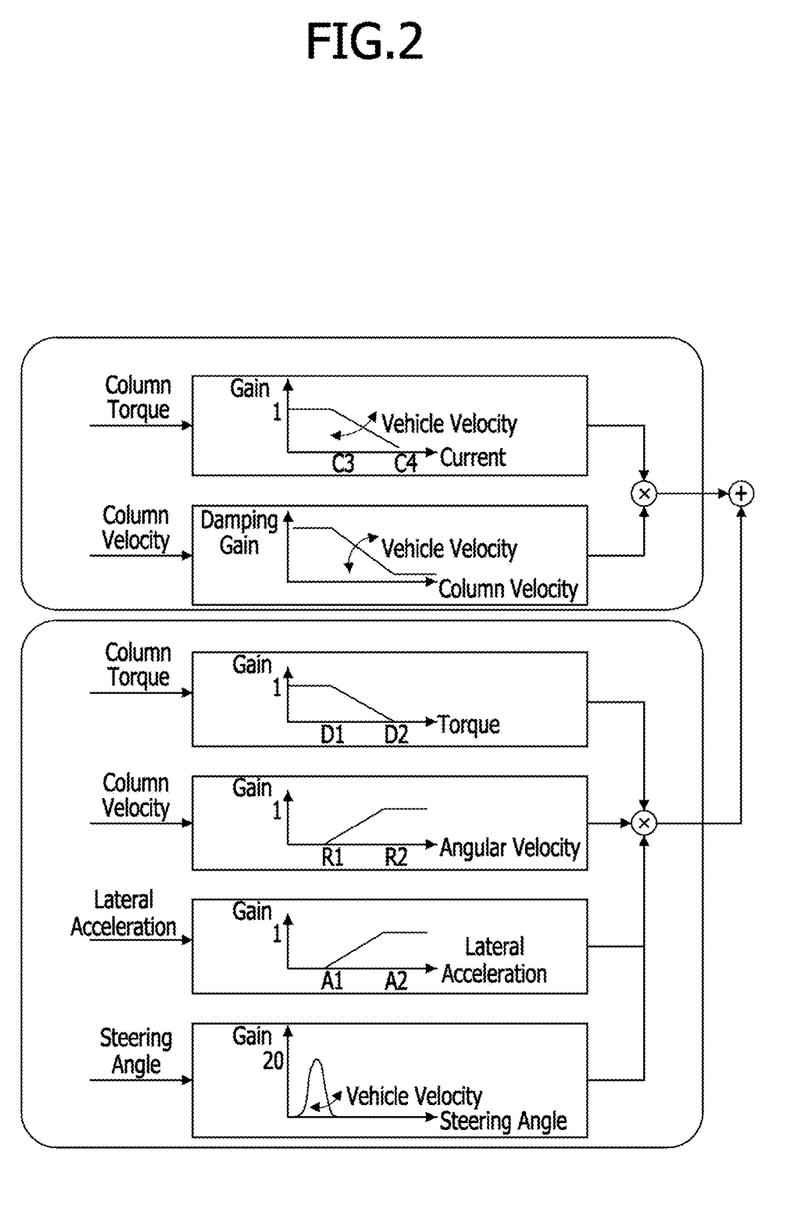
FIG. 2 is a diagram conceptually illustrating the logic of a damping controller in accordance with the embodiment of the present invention.
Figure 3:
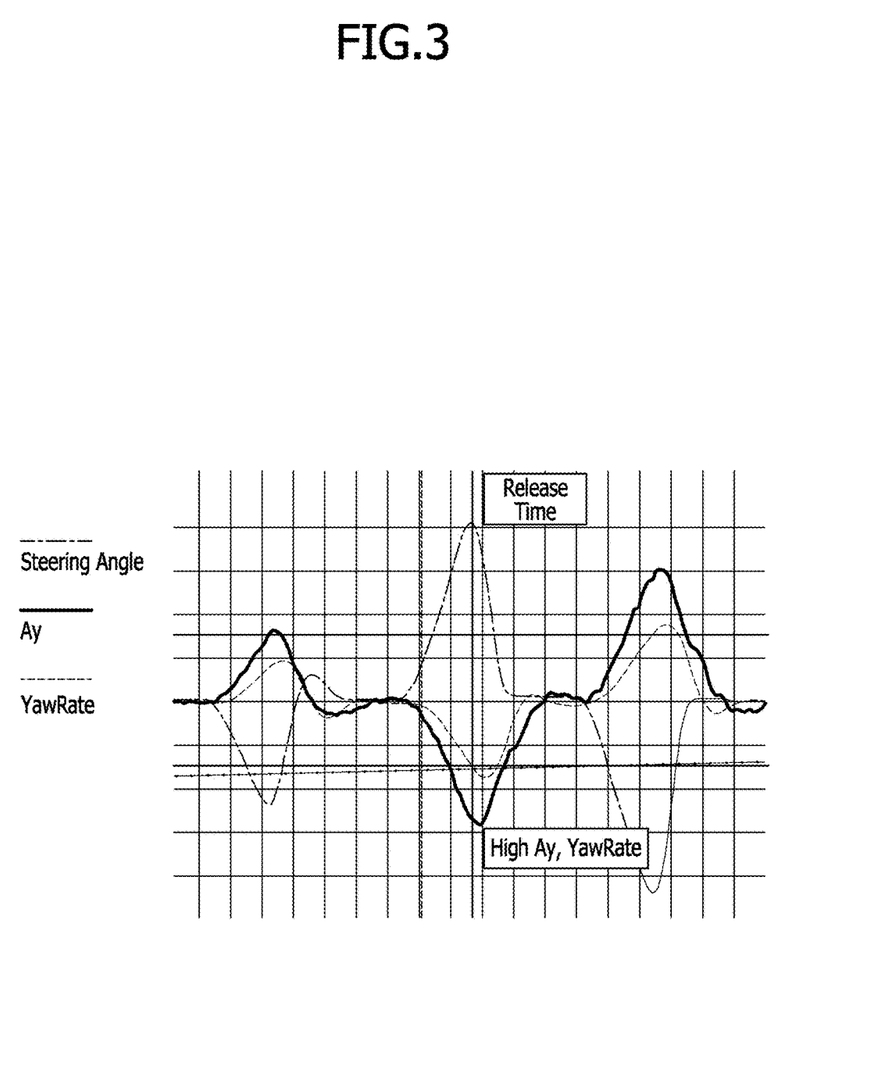
FIG. 3 is a diagram illustrating a lateral acceleration and yaw rate depending on a large-steering-angle and release condition.
Figure 4:
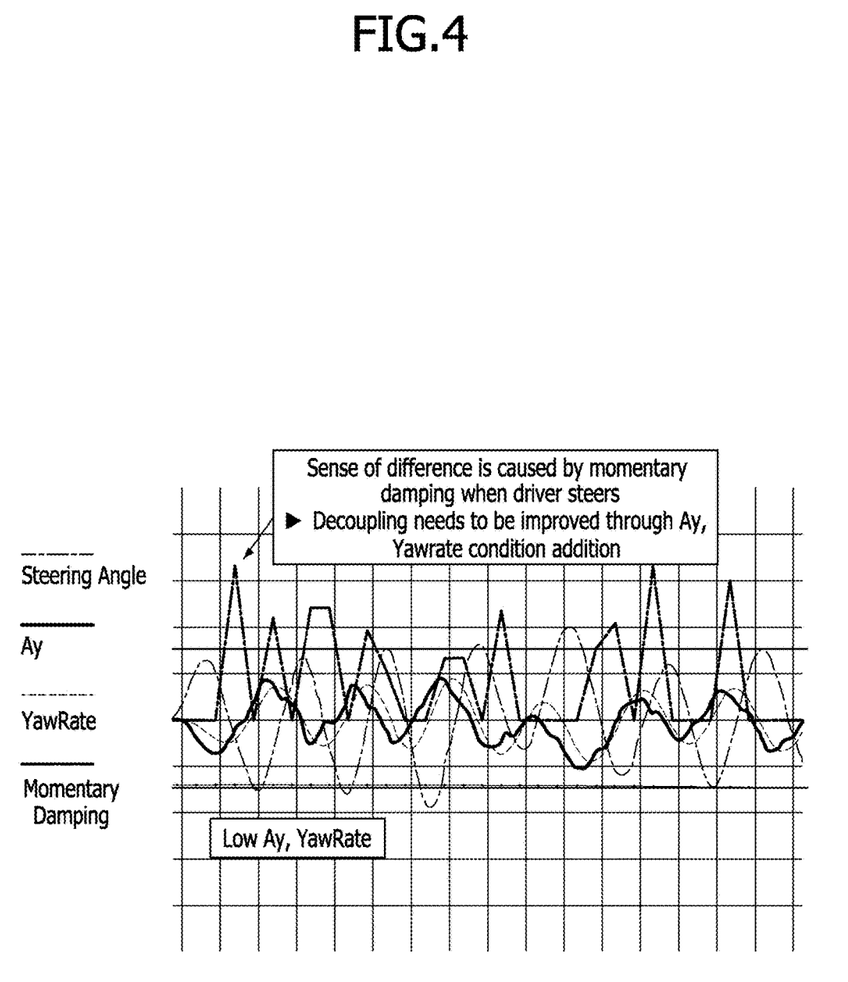
FIG. 4 is a diagram illustrating a lateral acceleration and yaw rate depending on a continuous steering condition in accordance with the embodiment of the present invention.
Figure 5:
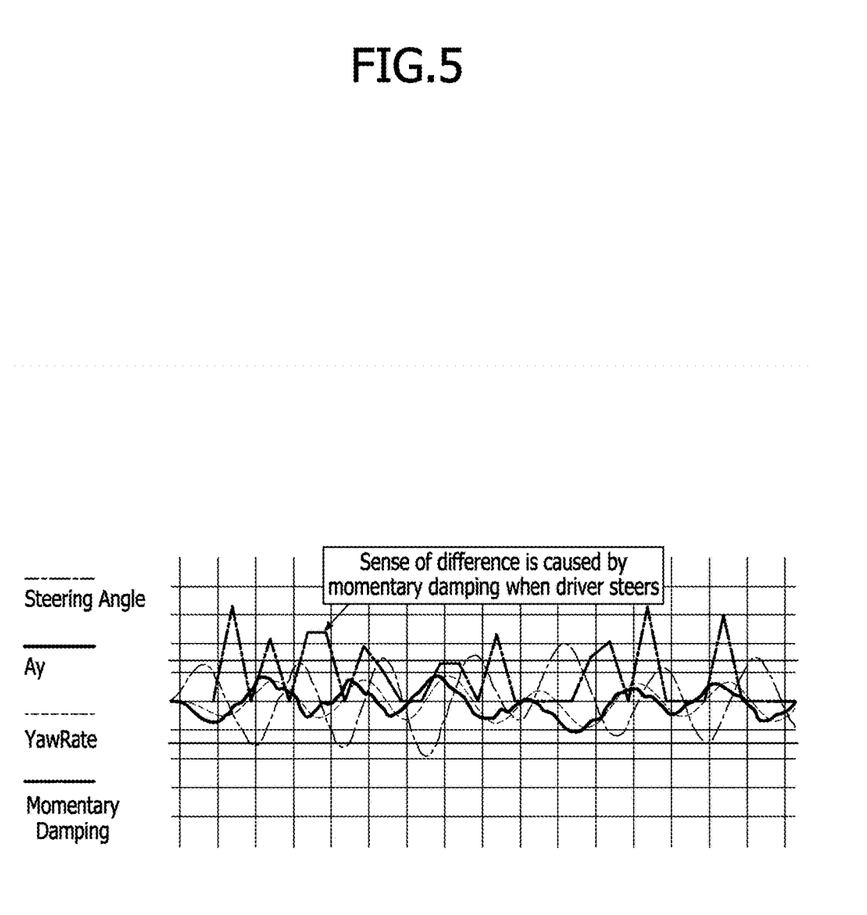
FIG. 5 is a diagram illustrating an example in which a sense of difference occurs in an on-center region in accordance with the embodiment of the present invention.
Figure 6:
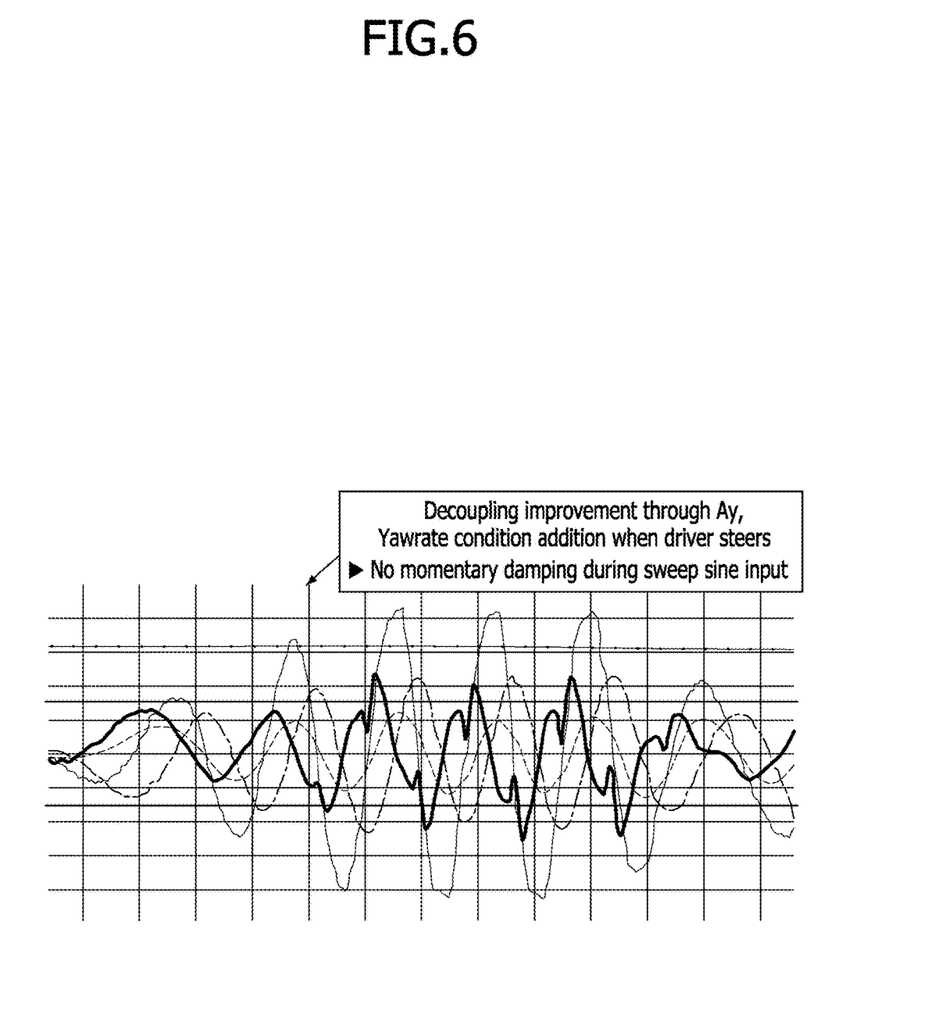
FIG. 6 is a diagram illustrating an example in which a sense of difference in the on-center region is removed in accordance with the embodiment of the present invention.

FIG. 1 is a block diagram illustrating a steering return control apparatus of MDPS in accordance with an embodiment of the present invention, FIG. 2 is a diagram conceptually illustrating the logic of a damping controller in accordance with the embodiment of the present invention, FIG. 3 is a diagram illustrating a lateral acceleration and yaw rate depending on a large-steering-angle and release condition, FIG. 4 is a diagram illustrating a lateral acceleration and yaw rate depending on a continuous steering condition in accordance with the embodiment of the present invention, FIG. 5 is a diagram illustrating an example in which a sense of difference occurs in an on-center region in accordance with the embodiment of the present invention, and FIG. 6 is a diagram illustrating an example in which a sense of difference in the on-center region is removed in accordance with the embodiment of the present invention.

Referring to FIG. 1, the steering return control apparatus of MDPS in accordance with the embodiment of the present invention may include a column torque sensor 10, a steering angle sensor 20, a column velocity calculator 30, a vehicle velocity sensor 40, a lateral acceleration sensor 50 and a damping controller 60.

The column torque sensor 10 may measure a column torque of a steering wheel in order to detect a driver's steering torque inputted to the steering wheel (not illustrated).

The steering angle sensor 20 may measure a steering angle of the steering wheel.

The column velocity calculator 30 may calculate a column velocity or angular velocity at which a steering column is rotated, based on the steering angle of the steering wheel, measured by the steering angle sensor 20.

The vehicle velocity sensor 40 may measure the velocity of the vehicle.

The lateral acceleration sensor 50 may measure a lateral acceleration of the vehicle.

The damping controller 60 may receive the column torque, the steering angle, the column velocity, the vehicle velocity and the lateral acceleration from the column torque sensor 10, the steering angle sensor 20, the column velocity calculator 30, the vehicle velocity sensor 40 and the lateral acceleration sensor 50, respectively.

The damping controller 60 may determine whether at least one of the column torque, the column velocity and the vehicle velocity satisfies a preset damping compensation condition. When the damping compensation condition is satisfied, the damping controller 60 may detect a damping compensation gain according to at least one of the column torque and the column velocity, and apply the detected damping compensation gain to a default damping amount, thereby compensating for the default damping amount.

While the damping compensation condition is satisfied, the damping controller 60 may determine whether the steering angle falls within a preset on-center region. When the steering angle falls within the on-center region, the damping controller 60 may detect the damping compensation gain in the on-center region according to one or more of the column torque, the column velocity and the lateral acceleration, and apply the detected damping compensation gain to the default damping amount, thereby compensating for the default damping amount.

The damping controller 60 may include a damping compensation condition determination unit 61, an on-center region determination unit 62 and a damping compensation unit 63.

The damping compensation condition determination unit 61 may determine whether the damping compensation condition is satisfied, using the column torque, the column velocity and the vehicle velocity which are inputted from the column torque sensor 10, the column velocity calculator 30 and the vehicle velocity sensor 40. When determining that the damping compensation condition is satisfied, the damping compensation condition determination unit 61 may detect a damping compensation gain based on the column torque and the column velocity, and apply the damping compensation gain to the default damping amount.

In case of steering to right (RH), the damping compensation condition determination unit 61 may determine that the damping compensation condition is satisfied, when the vehicle velocity is equal to or more than 80 kph, the column torque is equal to or less than 1.7 Nm, and the column velocity is equal to or less than −0.6 rps. In case of steering to left (LH), the damping compensation condition determination unit 61 may determine that the damping compensation condition is satisfied, when the vehicle velocity is equal to or more than 80 kph, the column torque is equal to or less than −1.7 Nm, and the column velocity is equal to or less than 0.6 rps.

The on-center region determination unit 62 may determine whether the steering angle inputted from the steering angle sensor 20 falls within the preset on-center region.

The on-center region where the steering angle of the steering wheel is around 0 degrees may indicate a steering angle range that is set around 0 degrees. That is, when the steering angle falls within the on-center region, it may indicate that the steering wheel is located in the center or at a close position to the center. The range of the on-center region may be variably set depending on the vehicle velocity.

When the determination result of the damping compensation condition determination unit 61 indicates that the damping compensation condition is satisfied, the damping compensation unit 63 may detect a damping compensation gain based on the column torque and column velocity depending on the vehicle velocity, and apply the damping compensation gain to the default damping amount. For example, as illustrated in FIG. 2, the damping compensation unit 63 may decrease the slope of the damping gain according to the column velocity, when the damping compensation condition is satisfied. Then, the final damping amount may be reduced to increase the return velocity of the steering wheel.

The default damping amount may indicate a damping amount which is calculated through an existing method using the vehicle velocity, the column torque and the column velocity, regardless of whether the damping compensation condition is satisfied.

When the steering angle is present in the preset on-center region while the damping compensation condition is satisfied, the damping compensation unit 63 may detect the damping compensation gain in the on-center region depending on one or more of the column torque, the column velocity and the lateral acceleration, and apply the damping compensation gain to the default damping amount, thereby compensating for the default damping amount.

That is, when the steering angle falls within the on-center region while the damping compensation condition is satisfied, the damping compensation unit 63 may linearly adjust one or more of a column torque gain for the column torque, a column velocity gain for the column velocity, and a lateral acceleration gain for the lateral acceleration. In this case, the damping compensation unit 63 may adjust the column velocity gain to be proportional to the column velocity, and adjust the column torque gain to be inversely proportional to the column torque.

In particular, the damping compensation unit 63 may adjust the lateral acceleration gain to be proportional to the lateral acceleration. When the lateral acceleration is equal to or less than a preset lateral acceleration reference value, the damping compensation unit 63 may set the lateral acceleration gain to a preset lateral acceleration value or less, thereby adjusting the damping compensation gain to a preset damping compensation gain value or less. For example, the damping compensation unit 63 may adjust the damping compensation gain to 0.

The preset damping compensation gain value may indicate a gain for applying only the default damping amount in the on-center region. As a result, when the driver forcibly returns the steering wheel, a difference between the return velocity of the steering wheel based on the default damping amount and the steering velocity of the driver may be minimized to reduce a slight sense of difference in the on-center region.

Referring to FIG. 3, when the driver releases the steering wheel after operating the steering wheel, the lateral acceleration and the yaw rate are relatively high at the point of time that the steering wheel is released. Referring to FIG. 4, when the driver continuously steers the vehicle, the lateral acceleration and the yaw rate are relatively small. In particular, a sense of difference may be caused by a momentary damping to prevent an overshoot in the on-center region.

As illustrated in FIG. 5, when a momentary damping occurs in the on-center region while the driver steers the vehicle, a slight sense of difference may be caused by the difference between the return velocity of the steering wheel based on the default damping amount and the steering velocity by the driver.

Then, as illustrated in FIG. 6, the damping compensation gain may be adjusted to 0 such that only the default damping amount is applied to the steering wheel. Thus, the slight sense of difference in the on-center region can be minimized.

Figure 7:
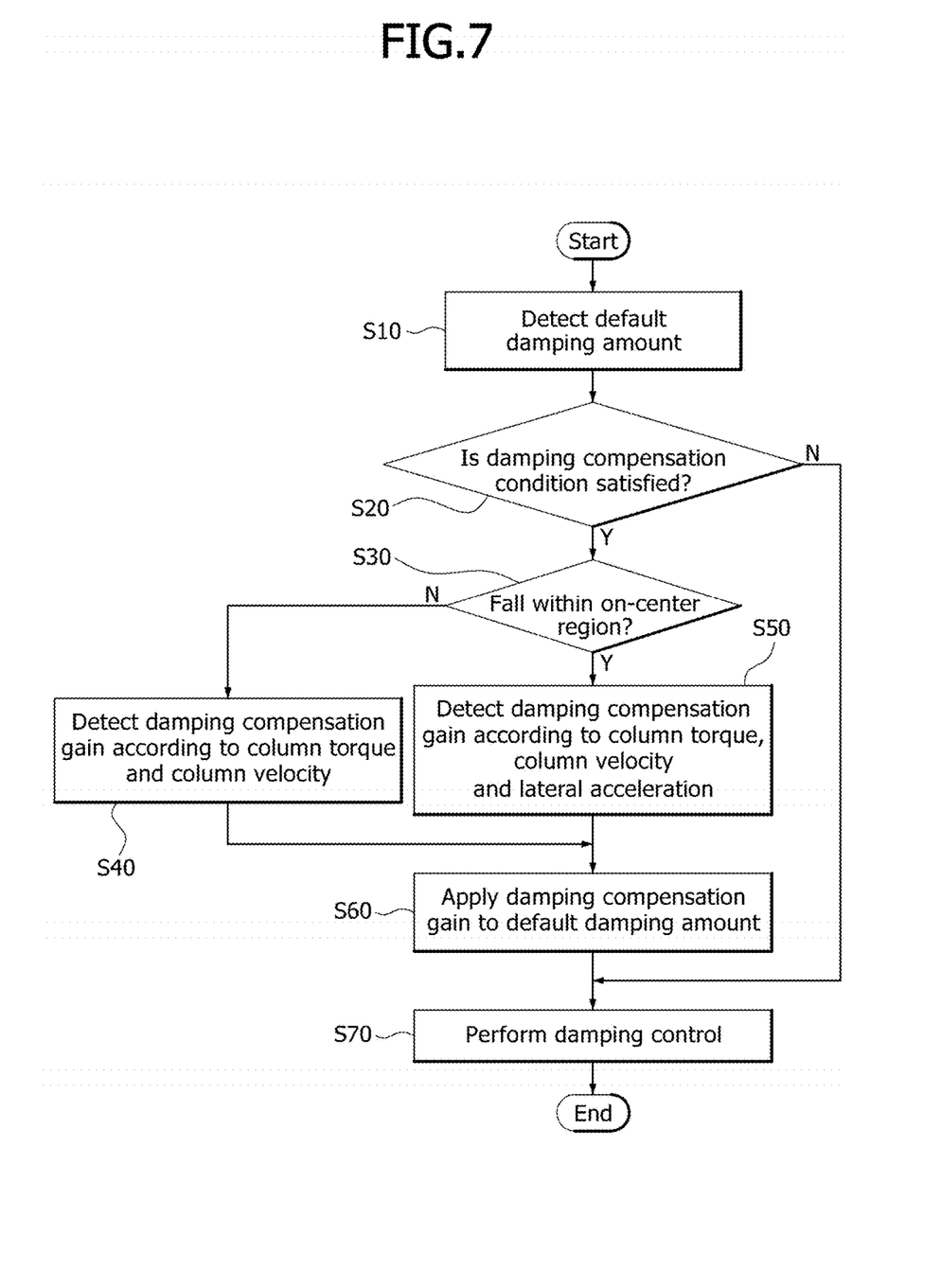
FIG. 7 is a flowchart illustrating a steering return control method of MDPS in accordance with an embodiment of the present invention.

FIG. 7 is a flowchart illustrating a steering return control method of MDPS in accordance with an embodiment of the present invention.

Referring to FIG. 7, the column torque sensor 10 may measure a column torque of the steering wheel, the steering angle sensor 20 may measure a steering angle of the steering wheel and output the measured steering angle, and the column velocity calculator 30 calculate the column velocity or angular velocity at which the steering column is rotated, based on the steering angle measured by the steering angle sensor 20, and output the calculated angular velocity. The vehicle velocity sensor 40 may sense a vehicle velocity of the vehicle, and the lateral acceleration sensor 50 may measure a lateral acceleration of the vehicle.

In this case, the damping controller 60 may detect a default damping amount using the column velocity and the column torque depending on the vehicle velocity, at step S10.

The damping controller 60 may determine whether at least one of the column torque, the column velocity and the vehicle velocity satisfies the preset damping compensation condition, at step S20.

That is, in case of steering to right (RH), the damping controller 60 may determine that the damping compensation condition is satisfied, when the vehicle velocity is equal to or more than 80 kph, the column torque is equal to or less than 1.7 Nm, and the column velocity is equal to or less than −0.6 rps. In case of steering to left (LH), the damping compensation condition determination unit 61 may determine that the damping compensation condition is satisfied, when the vehicle velocity is equal to or more than 80 kph, the column torque is equal to or less than −1.7 Nm, and the column velocity is equal to or less than 0.6 rps.

When the determination result of step S20 indicates that the damping compensation condition is not satisfied, the damping controller 60 may output the detected default damping amount to perform damping control on the steering wheel, at step S70.

On the other hand, when the determination result of step S20 indicates that the damping compensation condition is satisfied, the damping controller 60 may determine whether the steering angle falls within the on-center region, at step S30. The on-center region where the steering angle of the steering wheel is around 0 degrees may indicate a steering angle range that is set around 0 degrees.

When the determination result of step S30 indicates that the steering angle does not fall within the on-center region, the damping controller 60 may detect a damping compensation gain according to the column torque and the column velocity at step S40, apply the detected damping compensation gain to the default damping amount at step S60, and perform damping control on the steering wheel at step S70. For example, the damping controller 60 may increase the return velocity of the steering wheel by decreasing the damping slope according to the column velocity.

On the other hand, when the determination result of step S30 indicates that the steering angle falls within the on-center region, the damping controller 60 may detect a damping compensation gain in the on-center region according to one or more of the column torque, the column velocity and the lateral acceleration at step S50, apply the damping compensation gain to the default damping amount at step S60, and perform damping control on the steering wheel at step S70.

That is, when the steering angle falls within the on-center region while the damping compensation condition is satisfied, the damping controller 60 may linearly adjust one or more of a column torque gain for the column torque, a column velocity gain for the column velocity, and a lateral acceleration gain for the lateral acceleration.

In this case, the damping controller 60 may adjust the column velocity gain to be proportional to the column velocity, and adjust the column torque gain to be inversely proportional to the column torque.

In particular, when the lateral acceleration is equal to or less than the lateral acceleration reference value, the damping controller 60 may set the lateral acceleration gain to a preset lateral acceleration value or less, and adjust the damping compensation gain to a preset damping compensation gain value or less. For example, the damping controller 60 may adjust the damping compensation gain in the on-center region to 0.

That is, while the steering angle falls within the on-center region and the lateral acceleration is equal to or less than the lateral acceleration reference value, the damping controller 60 may apply only the default damping amount, thereby not only minimizing a difference between the return velocity of the steering wheel based on the default damping amount and the steering velocity by the driver, but also minimizing a slight sense of difference in the on-center region.

As such, the steering return control apparatus and method of MDPS in accordance with the embodiments of the present invention can minimize a slight sense of difference in the on-center region when the steering wheel is returned after being operated at a large steering angle during driving.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A Motor Driven Power Steering (MPDS) system, comprising:
a motor;
a column torque sensor configured to sense a column torque applied to a steering wheel;
a steering angle sensor configured to measure a steering angle of the steering wheel;
a column rotational velocity calculator configured to calculate a column rotational based on the steering angle sensed by the steering angle sensor;
a vehicle velocity sensor configured to sense a vehicle velocity;
a lateral acceleration sensor configured to sense a lateral acceleration of the vehicle; and
a controller configured to control the motor to provide damping against the steering wheel's return based on the column torque, the column velocity, and the vehicle velocity,
wherein the controller is configured to control the motor to provide damping against the steering wheel's return based the column torque, the column velocity, the vehicle velocity and further based on the lateral acceleration, when the vehicle velocity is greater than a reference value, the column torque is smaller than a reference torque and the column rotational velocity is smaller than a reference rotational velocity.

2. The MDPS system claim 1, wherein the reference value is 80 kilometer per hour, the reference torque is 1.7 N·m, and the reference rotational velocity is 0.6 rotation per second (rps).

3. The MDPS system of claim 1, wherein the controller is configured to control the damping based on the lateral acceleration when the steering angle is within an on-center range about a center position that is the zero steering angle.

4. The MDPS system of claim 3, wherein the on-center range is variably set depending on the vehicle velocity.

5. A method of operating a Motor Driven Power Steering (MPDS) system, the method comprising:
sensing a column torque applied to a steering wheel using a column torque sensor;
sensing a steering angle of the steering wheel using a steering angle sensor;
calculating a column rotational based on the steering angle sensed by the steering angle sensor;
sensing a vehicle velocity using a vehicle velocity sensor using a vehicle velocity sensor;
sensing a lateral acceleration of the vehicle using a lateral acceleration sensor; and
controlling, by a controller, a motor of the MDPS system to provide damping against the steering wheel's return based on the column torque, the column velocity, and the vehicle velocity,
wherein the controller controls the motor based the column torque, the column velocity, the vehicle velocity and further based on the lateral acceleration, when the vehicle velocity is greater than a reference value, the column torque is smaller than a reference torque and the column rotational velocity is smaller than a reference rotational velocity.

6. The method of claim 5, wherein the reference value is 80 kilometer per hour, the reference torque is 1.7 N·m, and the reference rotational velocity is 0.6 rotation per second (rps).

7. The method of claim 5, wherein the controller controls the damping based on the lateral acceleration when the steering angle is within an on-center range about a center position that is the zero steering angle.

* * * * *